Patented Jan. 19, 1926.

1,570,469

UNITED STATES PATENT OFFICE.

ERICH FREUND AND HANS JORDAN, OF BERLIN, GERMANY, ASSIGNORS TO THE FIRM: CHEMISCHE FABRIK AUF ACTIEN (VORM. E. SCHERING), OF BERLIN, GERMANY.

RESIN SUBSTITUTE PRODUCED BY FRIEDEL CRAFTS REACTION.

No Drawing.  Application filed August 25, 1923. Serial No. 659,359½.

*To all whom it may concern:*

Be it known that we, ERICH FREUND and HANS JORDAN, citizens of Germany, residing at Berlin, Germany, have invented certain new and useful Improvements in Resin Substitutes Produced by Friedel Crafts Reaction, of which the following is a specification.

Our invention relates to resinous compounds for use as substitutes for natural resins and the like, and to the method of making same.

As is well known to those skilled in the art, if suitable compounds such as benzene and its homologues or other hydrocarbons or their derivatives are acted upon with chlorides and other compounds containing chlorine according to the reaction indicated by Friedel and Crafts, there are formed besides the products which it is intended to obtain, also varying quantities of resinous by-products.

We have now discovered that by causing this reaction to take place under certain suitable conditions, almost all of the reaction products can be obtained in the form of valuable viscous liquids some of which on solidifying have a resinous character. These products being produced according to Friedel-Crafts reaction are slightly fluorescent and in contradistinction to natural resins will not dissolve in nor be attacked by alkalies or acids.

We have ascertained more particularly that in many cases the anhydrous metal halides, which up till now were considered indispensable for the carrying out of Friedel-Crafts' reaction, can be replaced by chemically inert surface catalyzers, for instance fuller's earth, franconite, tonsil and the like (which are hydro-silicates of aluminium and magnesium).

In the majority of cases, the catalytically active substance should not exceed 10 percent of the total mass.

Further below some examples of new resinous bodies and of the means of making same in accordance with our invention will be given, but we wish it to be understood that we do not intend to be limited to the exact compounds, nor to the particular kind and sequence of operations recited in these examples, for obvious modifications will readily occur to a person skilled in the art.

*Example 1.*—Equimolecular quantities of naphthalene and napthalene tetrachloride are intimately mixed with a quantity of fuller's earth equaling about 0.1 percent of the total weight. This mixture is slowly heated, and at a temperature of about 60° C. a vigorous development of hydrochloric acid is started. After the principal reaction has come to an end, the viscous liquid is heated at 120° for about two hours. The product of reaction which has a dark green color is now dissolved in a suitable solvent, for instance carbon tetrachloride, and the solution is well shaken with water. Upon removal of the solvent, there remains a dark colored hard resin of valuable properties which can be decolorized, if desired, with the aid of fuller's earth or the like. The resin obtained is soluble in carbon tetrachloride, acetone, ethyl acetate and hydrocarbons of the benzene type, but insoluble in alcohol. It softens at about 65° C. On this resin being bleached, its color will change to a golden yellow.

*Example 2.*—40 parts by weight of acetylene tetrachloride are boiled with 20 parts of xylene and 1 part of fuller's earth until the development of hydrochloric acid has come to an end. The product of reaction is treated further as described with reference to Example 1. The final product is a viscous liquid colored a dark green and readily dissolving in carbon tetrachloride, chloroform and hydrocarbons of the benzene type.

*Example 3.*—Equal parts by weight of the phenolic bodies present in low temperature tar and of naphthalene tetrachloride are heated with 0.1 percent fuller's earth to 120-130° C. until no more hydrochloric acid is developed. The product of reaction is then treated further as described with reference to Example 1. The final product is a dark green mass readily soluble in alcohol and softening at about 80° C.

We claim:—

1. The method of making substitutes for natural resins which consists in subjecting an aromatic compound of the kind which can react with certain halogen compounds according to Friedel and Crafts reaction, to the action of such a halogen compound in the presence of so much of a surface catalyser that the formation of addition products is substantially prevented and mainly viscous bodies are obtained.

2. The mehod of making substitutes for natural resins which consists in subjecting an aromatic compound of the kind which can react with certain halogen compounds, according to Friedel and Crafts reaction, to the action of such a halogen compound in the presence of a quantity of a surface catalyser not exceeding ten percent.

3. The method of making substitutes for natural resins which consists in subjecting an aromatic compound of the kind which can react with certain halogen compounds according to Friedel and Crafts reaction, to the action of the molecular quantity of such a halogen compound in the presence of so much of a surface catalyser that the formation of addition products is substantially prevented and mainly viscous bodies are obtained.

4. The method of making substitutes for natural resins which consists in subjecting an aromatic compound of the kind which can react with certain halogen compounds according to Friedel and Crafts reaction, to the action of the molecular quantity of such a halogen compound in the presence of a quantity of a surface catalyser not exceeding ten percent.

5. The method of making substitutes for natural resins which consists in subjecting an aromatic compound of the kind which can react with certain halogen compounds according to Friedel and Crafts reaction, to the action of such a halogen compound in the presence of a quantity of fuller's earth not exceeding ten percent.

6. As a new product, a resin substitute of dark green color showing a slight fluorescence, softening above 60° C., dissolving in carbon tetrachloride, chloroform and hydrocarbons of the benzene series and resistive against the action of alkalis and acids.

In testimony whereof we affix our signatures.

ERICH FREUND.
HANS JORDAN.